J. J. FLYCKT.
GAS MACHINE.
APPLICATION FILED DEC. 7, 1916.

1,267,202.

Patented May 21, 1918.
3 SHEETS—SHEET 1.

Witnesses

J. J. Flyckt
Inventor
by
Attorneys

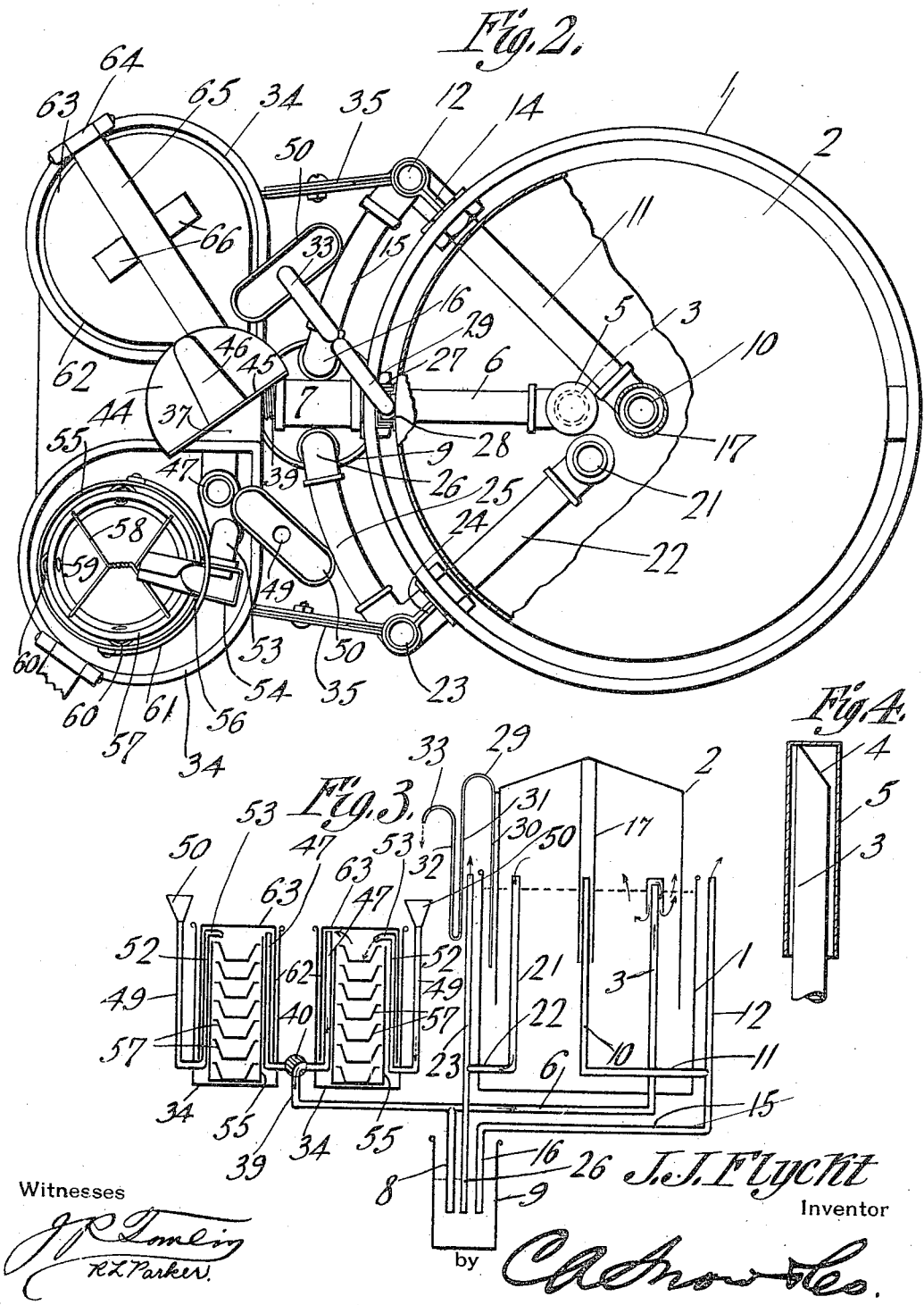

J. J. FLYCKT.
GAS MACHINE.
APPLICATION FILED DEC. 7, 1916.
1,267,202.
Patented May 21, 1918.
3 SHEETS—SHEET 3.
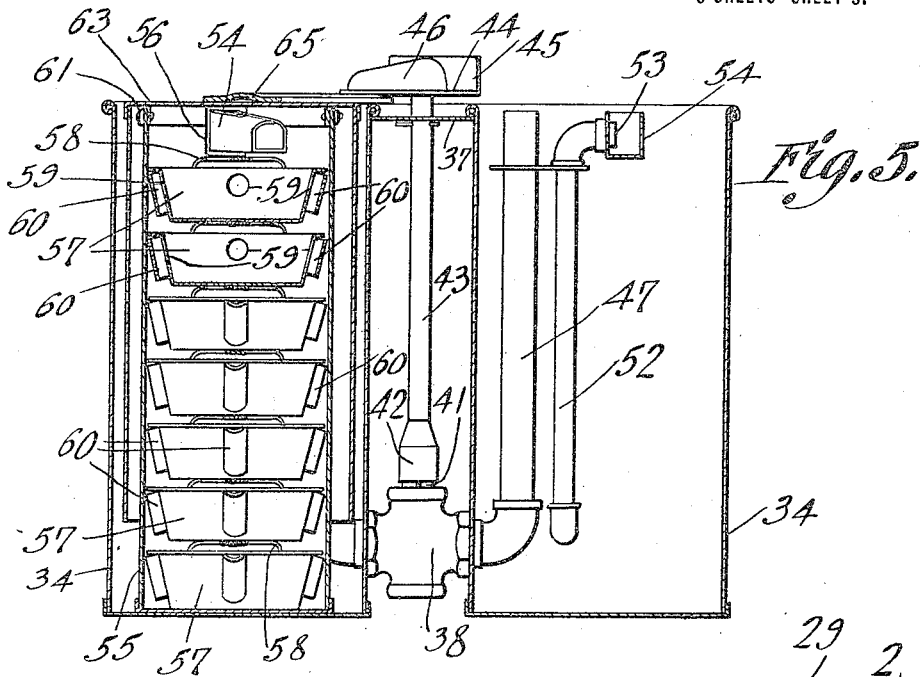
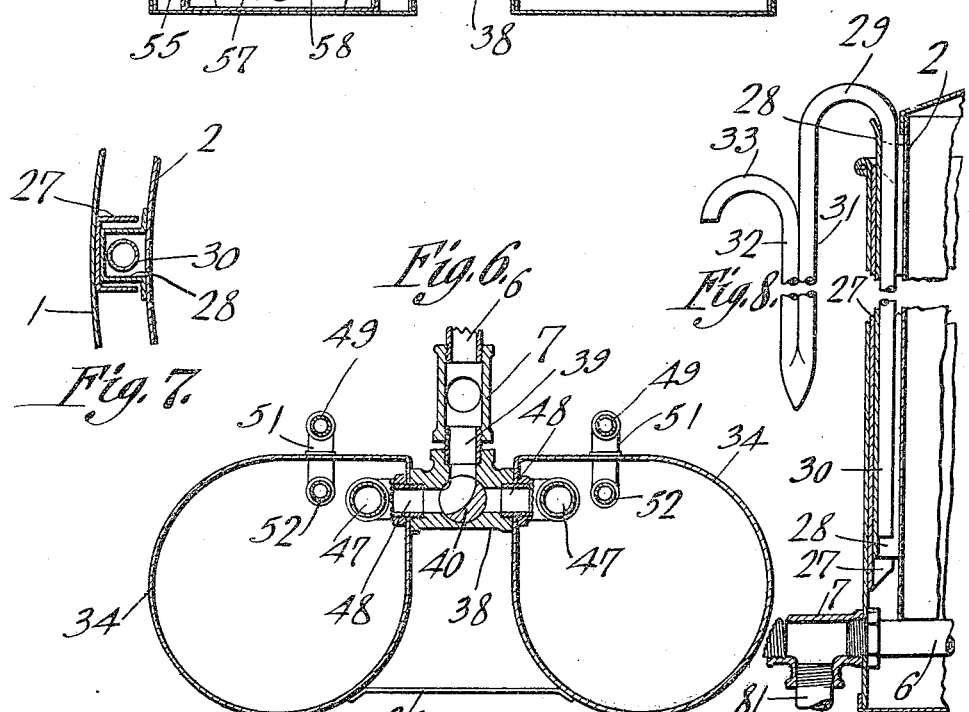

UNITED STATES PATENT OFFICE.

JOHN J. FLYCKT, OF SALINA, KANSAS.

GAS-MACHINE.

1,267,202.  Specification of Letters Patent.  Patented May 21, 1918.

Application filed December 7, 1916. Serial No. 135,649.

*To all whom it may concern:*

Be it known that I, JOHN J. FLYCKT, a citizen of the United States, residing at Salina, in the county of Saline and State of Kansas, have invented a new and useful Gas-Machine, of which the following is a specification.

The device forming the subject matter of this application is adapted to be employed for making gas out of calcium carbid and water.

The invention aims to improve the means whereby the water is delivered to the carbid pans, to provide improved means whereby the flow of gas is controlled, to improve the gasometer structure generally, to improve the carbid holding means, and, generally, to improve and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 2 is a top plan of a gas machine embodying the improvements hereinafter described, parts being broken away and parts appearing in section;

Fig. 3 is a diagram showing the machine hereinafter described;

Fig. 4 is a sectional detail illustrating one of the pipes and its cap, which are located inside the bell of the gasometer;

Fig. 5 is a vertical section taken through the auxiliary tanks which contain the carbid, parts appearing in elevation;

Fig. 6 is a horizontal section taken through the structure delineated in Fig. 5, the carbid pans being omitted;

Fig. 7 is a fragmental cross section taken through the main tank of the gasometer and through a portion of the bell which operates therein;

Fig. 8 is a longitudinal section of the structure shown in Fig. 7.

Figure 1:
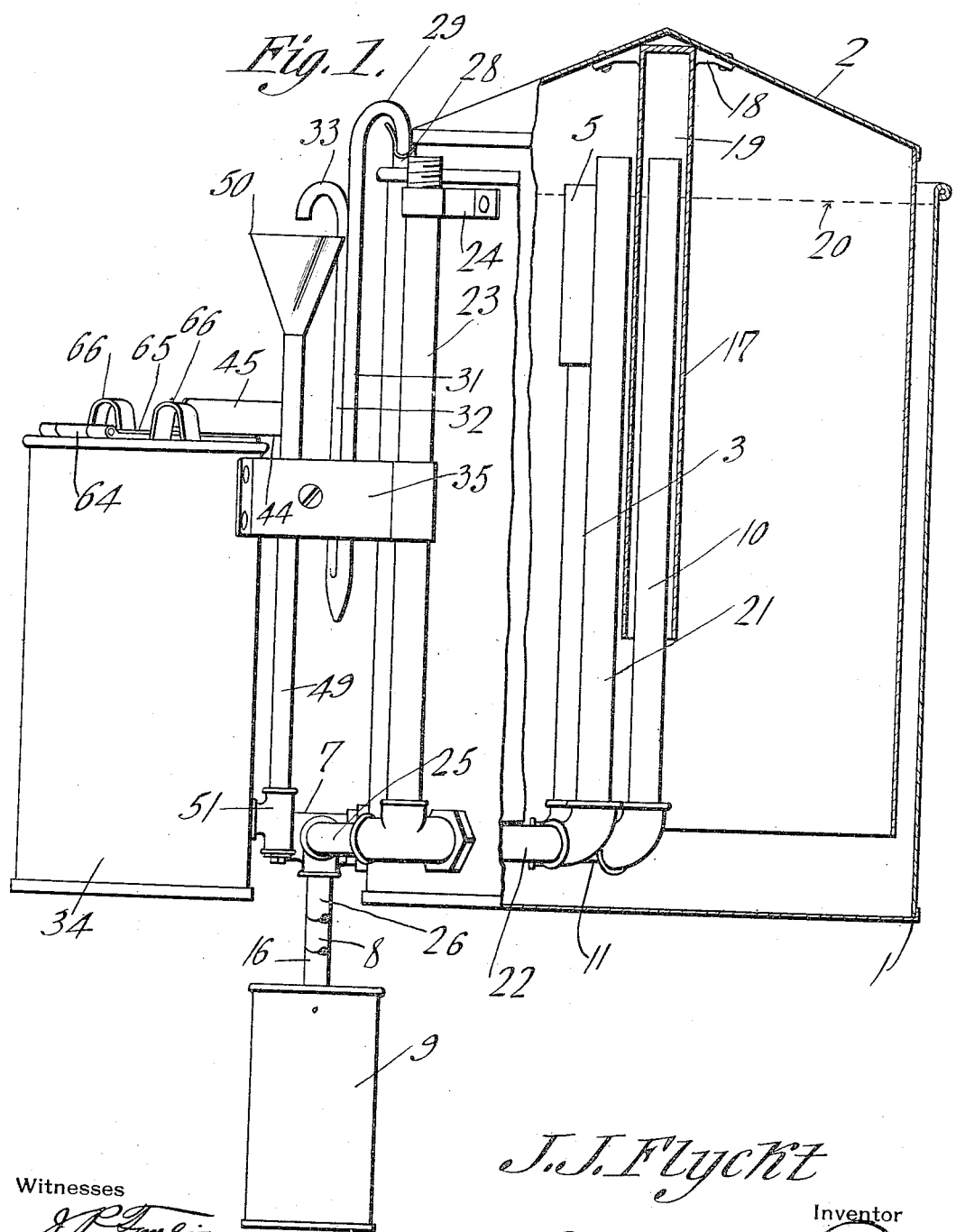
Figure 1 shows in side elevation, a gas machine constructed in accordance with the present invention, parts being broken away and parts appearing in section.

The gasometer includes a main tank 1 adapted to contain water. Mounted to move vertically in the main tank 1 and responsive to changes of volume in the accumulated gas is a bell 2. The bell 2 dips into the water seal in the tank 1. Upstanding within the bell 2 is a pipe 3, the upper end of which may be beveled as shown at 4 in Fig. 4. A cap 5 is inverted over the beveled end 4 of the pipe 3. Noting the diagrammatic figure which is numbered 3, it will be understood that gas passes upwardly through the pipe 3, and downwardly within the cap 5, the gas in this manner being delivered into the water in the tank 1, before the gas flows away through a delivery pipe which will be described hereinafter. The beveling of the end 4 of the pipe 3 facilitates the delivery of gas from the pipe 3 into the cap 5. The pipe 3 has a lateral extension 6 prolonged beneath the lower end of the bell 2 and passing outwardly through the side wall of the main tank 1, the lateral extension 6 being united with one end of a T-coupling 7, as indicated in Fig. 6. A depending pipe 8 is connected with the T-coupling 7 and is adapted to dip into a water seal contained within a can 9.

Upstanding within the contour of the bell 2 is a blow off pipe 10 having a lateral branch 11 extended beneath the lower edge of the bell 2 and prolonged through the side wall of the tank 1. Communicating with the lateral branch 11 is an upright blow off pipe 12, disposed outside of the main tank 1. Through the blow off pipe 12, gas passes when the bell has risen beyond a predetermined point. The upright blow off pipe 12 may be connected with the main tank 1 by means of a brace 14. The upright blow off pipe 12 has a horizontal arm 15 located adjacent the bottom of the main tank 1 and disposed exteriorly of the main tank. The horizontal arm 15 has a depending end 16 which dips into the water seal in the can 9. A closure tube 17 is attached by means of a bracket 18 to the top of the bell 2 and surrounds the pipe 10 slidably. When the bell 2 rises until the lower end of the tube 17 is above the level of the water in the main tank 1, the gas passes upwardly through the tube 17, downwardly through the pipe 10, laterally through the pipe 11, and out into the atmosphere by the pipe 12, undue pressure being relieved in this manner. Upstanding within the contour of the bell 2 is a pipe 21 having a lateral branch 22 prolonged below the lower edge of the bell and extended through the side wall of the main tank 1. The lateral branch 22 communicates with an upright delivery pipe 23 located outside of the tank 1, and through the pipe 23, the gas is conveyed to the place of use. The upright delivery pipe 23 may be sustained by means of a brace 24 connected with the tank 1. The pipe 23 has a horizontal arm 25 located near the bottom of the main tank 1 and terminating in a depending end 26 adapted to dip into the water seal in the can 9. It may now be observed that the depending ends 8, 26 and 16, shown clearly in Fig. 3, constitute means for conveying water of condensation from the pipes 3, 23 and 12, respectively, to the can 9, and because the lower extremities of the parts 8, 26 and 16 dip into the water seal in the can 9, an escape of gas is prevented.

Secured to the inside of the tank 1 is a vertical guide 27 which may be a channel. An upright trough or socket 28 is secured to the outer face of the bell 2 and reciprocates in the guide 27, the trough 28 being open at its upper and lower ends. The numeral 29 designates a siphon. One arm 30 of the siphon 29 extends downwardly into the trough 28, the siphon being supported upon the upper edge of the trough 28, so that when the bell 2 is raised and lowered by changes in the volume of gas within the bell, the siphon will be raised and lowered also. The siphon 29 includes an arm 31 located outside of the tank 1, the arm 31 terminating in an upstanding extension 32 having a depending outlet bend 33. The crown of the outlet bend 33 is disposed below the crown of the siphon 29.

The numeral 34 denotes a pair of auxiliary tanks in which the gas is produced. The tanks 34 may be connected with the main tank 1 by means of braces 35. The tanks 34 may be connected with each other by a brace 36 disposed adjacent their lower ends (Fig. 6). At their upper ends, the tanks 34 are connected by a top plate 37. The numeral 38 denotes a valve casing disposed between the auxiliary tanks 34 near to the lower ends thereof. The valve casing 38 is connected as shown at 39 with the T-coupling 7, and, consequently, is connected with the pipe 3 by means of its lateral extension 6. Journaled for rotation about a vertical axis in the valve casing 38 is a three-way valve 40 having an upstanding stem 41 (Fig. 5). The stem 41 of the three-way valve 40 is engaged by a socket 42 formed on the lower end of an operating member 43, preferably in the form of a rod. The rod 43 is journaled in the top plate 37 and extends above the top plate. Secured to the upper end of the rod 43 and disposed above the top plate 37 is a horizontal head 44 having an upstanding flange 45 whereby the rod 43 and consequently the valve 40 may be manipulated manually. The flange 45 is reinforced by a rib 46 connected with the flange and with the top plate 37.

Disposed within the auxiliary tanks 34 are upright gas pipes 47, communicating as indicated at 48 with the ends of the valve casing 38. Located exteriorly of the auxiliary tanks 34 are water pipes 49 having funnels 50 at their upper ends. The outlet bend 33 of the siphon 29 discharge into the funnels 50. By means of couplings 51, the lower ends of the water pipes 39 are united with upright inlet pipes 52 disposed within the auxiliary tanks 34. The upper ends of the pipes 52 are equipped with horizontal extensions 53 on which are mounted to swing, in vertical planes, spouts 54.

Arranged within the tanks 34 are buckets 55 having notches 56 in their upper edges, the notches 56 receiving the spouts 54 when the spouts are disposed in substantially horizontal positions. Because the spouts 54 are hinged or pivoted for vertical swinging movement to the extensions 53 of the water pipes 52, the spouts 54 may be turned up vertically, thereby permitting the buckets 55 to be removed. Disposed within the buckets 55 are superposed carbid pans 57. Each carbid pan 57 is provided at its upper end with a frame 58 which supports the next upper carbid pan. In the side walls of the carbid pans 57, holes 59 are formed, communicating with tubes 60 secured to the outer faces of the carbid pans, the tubes 60 being open at their upper and lower ends. The tubes 60 reinforce the walls of the carbid pans 57, they act as spacers, coacting with the buckets 55, and they serve to direct the water into the holes 59 in the carbid pans. The buckets 55 are supplied with pivoted bails 61. When the spouts 66 are in horizontal positions, and are supported in the notches 56 of the buckets 55, the bails 61 rest on top of the spouts and serve to hold the spouts in place.

Caps 62 are inverted over the buckets 55, the tops 63 of the caps 62 resting on the upper edges of the buckets. The tops 63 of the caps 62 engage the bails 61 of the buckets, and hold the bails down on the spouts 54. Pivoted as shown at 64 to the auxiliary or carbid tanks 34 are vertically swinging arms 65 received movably between keepers 66 on the tops 63 of the caps 62. The free ends of the arms 65 are received beneath the head 44 of the valve rod 43. This head 44, it should be observed, is of approximately semi-circular form viewed in top plan. The coöperation between the arms 65 and the head 44 will be made manifest hereinafter.

The operation of the structure hereinbefore described is as follows:—

By means of the head 44, the rod 43 and consequently the valve 40 may be rotated so that the valve 40, as shown in Fig. 6, and as indicated diagrammatically in Fig. 6, 3, will establish communication between the gas pipe 47 of one of the auxiliary tanks 34, and the pipes 6 and 3 whereby gas is delivered within the contour of the bell 2. When the head 44 is arranged as above described, it overhangs the arm 65 on the tank 34 from which gas is being delivered, and consequently, the cap 62 of the said tank is held down. Because the head 44 is of approximately semi-circular outline, the pivoted arm 65 on the other tank 34 is set free, as will be obvious from Fig. 2, so that the carbid in this auxiliary tank may be renewed.

The gas, passing through the pipes 6 and 3, flows downwardly within the contour of the cap 5 (Fig. 4) and is delivered beneath the surface of the water 20 in the bell 2. The gas then rises through the water and accumulates in the top of the bell 2, the gas being washed in this manner. From the top of the bell 2, the gas flows downwardly through the pipe 21 and upwardly through the delivery pipe 23.

When the gas in the bell 2 has been depleted, the bell 2 moves downwardly, the siphon 29 moving downwardly with the bell 2. Ultimately, the outlet bend 33 of the siphon passes below the level of the water 20, and thereupon, the water begins to flow through the siphon 29, the water being delivered by the outlet bend 33, into one or the other of the funnels 50, it being noted that it is possible to rotate the arm 30 of the siphon in the trough 28, so that the outlet bend 33 of the siphon may discharge into one or the other of the funnels 50, at the will of an operator.

The water, having been delivered into one of the funnels 50 by the outlet bend 33 of the siphon, flows downwardly in the water pipe 49 and moves upwardly through the inlet extension 52 of the water pipe. The water, traversing the horizontal extension 53 of the pipe 52, is received by one of the spouts 54 and is delivered within the contour of the uppermost carbid pan 57. The water accumulates in this carbid pan and, ultimately, passing through the holes 59 and the tubes 60, is discharged into the next lower carbid pan, this operation being continued until all of the carbid pans have been filled with water. When a sufficient amount of gas has been generated, the bell 2 will rise until the outlet bend 33 of the siphon is disposed above the water level 20 in the tank 1, and then no more water will be delivered into the funnels 50.

The gas produced within the cap 62 flows downwardly through the gas pipe 47 which extends upwardly within the cap 62. The gas then passes from the pipe 47 through the valve 40, the coupling 7, the pipe 6 and the pipe 3 into the bell 2, in the manner hereinbefore described.

Having thus described the invention, what is claimed is:—

1. In an acetylene gas machine, a main tank; a bell movable in the main tank; means for conducting gas from the bell; a pair of generators; water inlets for the generators; a gas inlet pipe opening into the bell and having branches leading to the generators; a valve in said pipe and constituting means for coupling the pipe to its branches selectively at the will of an operator; a socket on the bell; and a rigid siphon including an intake arm and an outlet arm, the intake arm being journaled in the socket to permit the siphon to be swung as an entity, thereby to position the outlet arm to discharge into the water inlets selectively, the socket constituting a lifting means for the siphon and constituting a means for preventing the siphon from tilting.

2. In an acetylene gas machine, a carbid receptacle; a bucket in the receptacle and having a notch in its upper edge; a carbid holding means in the bucket; a water inlet pipe in the receptacle; a spout discharging into the carbid holding means, the spout being pivoted to the inlet pipe for vertical movement and being received in the notch to retain the bucket against rotation; a bail pivoted to the bucket and supported on the spout; and a cap for the bucket, the cap lying above the bail.

3. In an acetylene gas machine, a main tank; a bell mounted to move in the tank; means for conducting gas from the bell; a pair of generators; a gas inlet pipe communicating with the bell and having branches leading to the generators; a rotary valve in said pipe and constituting means for connecting the pipe with its branches selectively; caps for the generators; a rod engaged directly with the valve; and a disk-like turning head carried by the rod and of sufficient size to overhang and retain both caps at once, the head being cut away at one side to release one of the caps at a time when the cap and the rod are rotated to operate the valve.

In testimony that I claim the foregoing as my own, I have hereto affixed my signature in the presence of two witnesses.

JOHN J. FLYCKT.

Witnesses:
R. V. ALLISON,
C. G. WILMARTH.

Copies of this patent may be obtained for five cents each, by addressing the "Commissioner of Patents, Washington, D. C."